(12) United States Patent
Berning et al.

(10) Patent No.: US 8,979,424 B2
(45) Date of Patent: Mar. 17, 2015

(54) SELF-PROPELLED ROAD-MILLING MACHINE

(75) Inventors: Christian Berning, Brühl (DE); Armin Montermann, Andernach (DE); Cyrus Barimanl, Königswinter (DE); Guenter Haehn, Königswinter (DE); Stefan Cutler, Buchholz (DE); Angela Cutler, legal representative, Buchholz (DE)

(73) Assignee: Wirtgen GmbH (DE)

( * ) Notice: Subject to any disclaimer, the term of this patent is extended or adjusted under 35 U.S.C. 154(b) by 60 days.

(21) Appl. No.: 12/881,337

(22) Filed: Sep. 14, 2010

(65) Prior Publication Data
US 2011/0123268 A1 May 26, 2011

(30) Foreign Application Priority Data

Sep. 18, 2009 (DE) .......................... 10 2009 041 842

(51) Int. Cl.
| | |
|---|---|
| E01C 23/08 | (2006.01) |
| F21S 10/00 | (2006.01) |
| B60Q 1/26 | (2006.01) |
| E01C 23/088 | (2006.01) |
| B60Q 1/50 | (2006.01) |

(52) U.S. Cl.
CPC ................ *E01C 23/088* (2013.01); *B60Q 1/50* (2013.01); *E01C 2301/30* (2013.01)
USPC .............................. 404/90; 116/202; 340/468

(58) Field of Classification Search
USPC ....................... 404/84.5, 90, 91, 108; 701/50; 116/35 R, 37, 38, 202; 340/468, 471, 340/472, 473
See application file for complete search history.

(56) References Cited

U.S. PATENT DOCUMENTS 2,485,719 A * 10/1949 Edwards ........................ 340/458
3,866,169 A * 2/1975 Haglund ........................ 340/901
(Continued)

FOREIGN PATENT DOCUMENTS

| DE | 1930596 | 3/1970 |
|---|---|---|
| DE | 19547698 A1 | 6/1997 |

OTHER PUBLICATIONS

German Office Action dated Apr. 23, 2010, 3 pages, with English translation. (not prior art).

*Primary Examiner* — Abigail A Risic
(74) *Attorney, Agent, or Firm* — Patterson Intellectual Property Law, PC; Lucian Wayne Beavers

(57) ABSTRACT

The invention relates to a self-propelled road-milling machine for doing work on surfacings on the ground, and in particular carriageways. The road-milling machine according to the invention is characterized by a signalling arrangement which has at least one control unit for the entry of at least two different states of operation by the driver of the road-milling machine and at least one visual indicator or display unit to indicate or display for the driver of the transporting vehicle the at least two states of operation which are preset with the control unit by the driver of the road-milling machine. The first state of operation may be a request for the transporting vehicle to be braked or stopped and the second state of operation may be a request for the transporting vehicle to be started or to continue travelling. In a preferred embodiment of the visual indicator or display unit, the request for braking or stopping is shown as a cross and the request for starting or continued travel as an arrow.

12 Claims, 2 Drawing Sheets

(56) References Cited

U.S. PATENT DOCUMENTS

Figure 1:
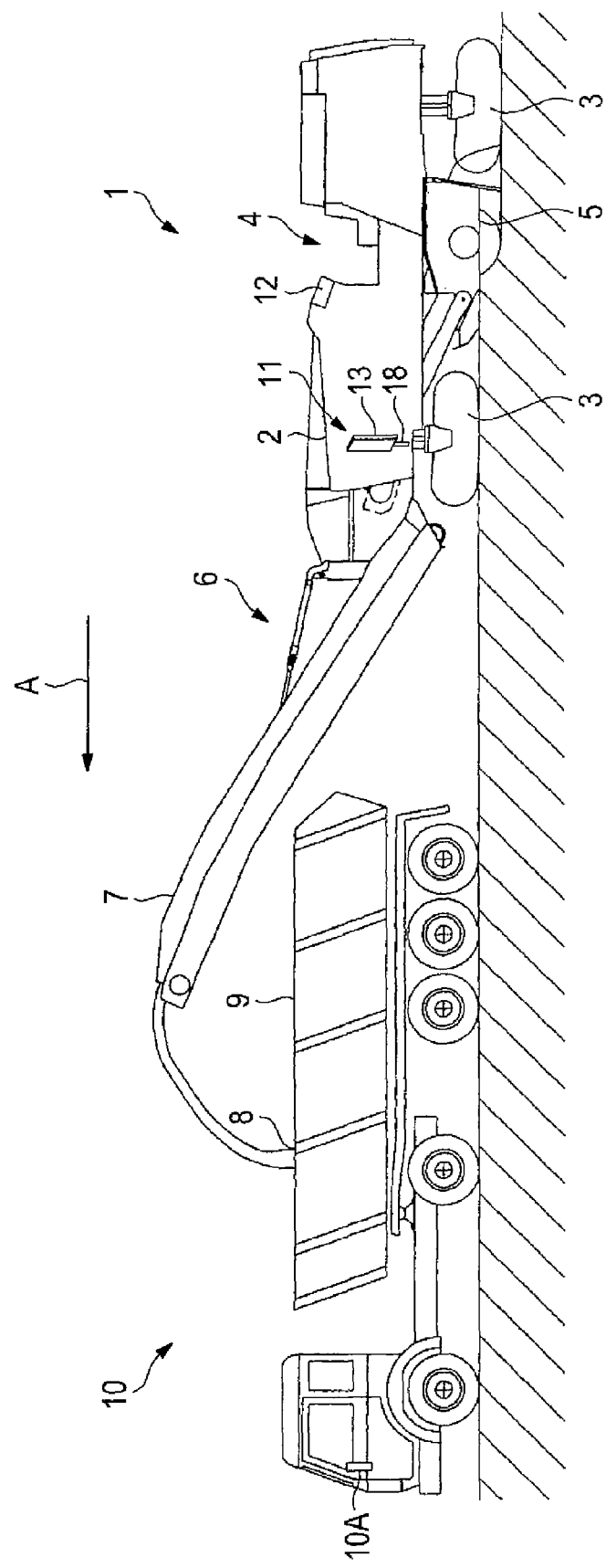

| | | |
|---|---|---|
| 5,749,783 A * | 5/1998 | Pollklas ............... 460/119 |
| 5,921,708 A * | 7/1999 | Grundl et al. ............ 404/84.1 |
| 7,034,666 B2 * | 4/2006 | Knutson .................. 340/431 |
| 7,422,390 B2 * | 9/2008 | Gaertner et al. ............ 404/76 |
| 8,077,023 B2 * | 12/2011 | King et al. ................ 340/431 |
| 2008/0282966 A1 * | 11/2008 | Williams ................ 116/35 R |
| 2009/0044505 A1 * | 2/2009 | Huster et al. ............ 56/10.2 R |
| 2010/0215433 A1 * | 8/2010 | Fritz ...................... 404/84.5 |
| 2010/0296867 A1 * | 11/2010 | Buschmann et al. ........ 404/108 |

\* cited by examiner

SELF-PROPELLED ROAD-MILLING MACHINE

This application claims priority to German patent application No. 10 2009 041 842.3 filed Sep. 18, 2009.

The invention relates to a self-propelled road-milling machine for doing work on surfacings on the ground, and in particular on carriageways.

Self-propelled road-milling machines have long been known. They have a milling arrangement by which material is milled off the surfacing on the ground, and a material-handling arrangement by which the material milled off is fed from the milling arrangement to a discharge point. At the discharge point, the material is received by a transporting vehicle driving ahead of or following the road-milling machine.

Known road-milling machines are capable of milling off a relatively large volume of material in a relatively short time, the conveyor belt of the material-handling arrangement being operated at a relatively high speed of feed.

When road-milling machines are being used, there is a problem which arises during travel, namely that of the transporting vehicle receiving the material discharged by the conveyor belt at the discharge point at the same time as it is discharged. What needs to be avoided in this case is, on the one hand, the material being discharged ahead of or to the rear of or next to the load-carrying space on the transporting vehicle. What needs to be avoided on the other hand is the transporting vehicle being overloaded. The aim is for the material to be evenly distributed along the entire length of the load-carrying space.

Loading of the milled-off material onto the transporting vehicle is found to be difficult inasmuch as, although the driver of the road-milling machine is able to watch the loading process, the driver of the transporting vehicle cannot. For as long as road-milling machines have been known, the usual practice on site has been, for lack of any better aids, for the driver of the road-milling machine to use the horn of his machine to direct the driver of the transporting vehicle even though the actual purpose of the horn is a different one.

In the case of what is referred to as a front-unloading road-milling machine, in which the conveyor belt of the material-handling arrangement extends forward in the working direction to a level higher than the front part of the chassis of the machine, the transporting vehicle, such as a dumper lorry for example, drives ahead of the road-milling machine. The speed of the transporting vehicle is generally higher than that of the road-milling machine in this case. Consequently, the discharge point moves from a point at the front towards the rear above the load-carrying space of the transporting vehicle. The driver of the road-milling machine is able to watch this happening. When the discharge point is at the rear end of the load-carrying space, the driver of the road-milling machine blows his horn to tell the driver of the transporting vehicle to stop his vehicle. Because the road-milling machine continues to travel, the discharge point moves to the front end of the load-carrying space. When the discharge point has reached the front end of the load-carrying space, the driver of the road-milling machine blows his horn again to tell the driver of the transporting vehicle to start moving.

Basically, the requesting of the starting and stopping of the transporting vehicle by horn signals has proved satisfactory in practice. For this reason, there has, to date, always been a desire to stick to this standard practice. This practice does have various disadvantages but these are not obvious.

In the first place, the horn signals may be a source of irritation to other road users because the drivers of vehicles passing by the site are not aware or cannot appreciate that the horn signals are instructions to the driver of the transporting vehicle. Also the horn signals involve noise, which is a nuisance not only to the personnel on the site but also to people living close to the site, especially when work is being done at night.

On the other hand, the driver of the transporting vehicle may also be distracted by possible horn signals from passing vehicles, which may result in a collision between the transporting vehicle and the road-milling machine or in the milled-off material being discharged to the rear of the load-carrying space of the transporting vehicle.

What the constantly repeated horn signals may also result in however is the site personnel no longer being able to distinguish between a horn signal by which the driver of the road-milling machine wishes to warn the site personnel of a danger and a horn signal which is given as an instruction to the driver of the transporting vehicle. Consequently, for the site personnel, the horn signal ceases to serve the purpose for which it is actually intended.

What is more, it calls for relatively close attention on the part of the driver of the transporting vehicle for him to detect the horn signals, because they may not be heard on the site. If the driver of the transporting vehicle misses hearing the horn signal, he does not have any opportunity of finding out, afterwards, what instructions the driver of the road-milling machine has given.

The object underlying the invention is therefore to provide a self-propelled road-milling machine by which the milled-off material can be unloaded easily and safely onto the load-carrying space of a transporting vehicle.

The inventors have realised, on site, that the practice which has long been customary of giving the driver of the transporting vehicle the requisite instructions with horn signals involves the above-mentioned disadvantages.

In one embodiment, the road-milling machine according to the invention is characterised by a signalling arrangement which comprises a control unit for the entry of at least two different states of operation by the driver of the road-milling machine and a visual indicator or display unit to indicate or display for the driver of the transporting vehicle the at least two states of operation which are preset with the control unit by the driver of the road-milling machine. The signalling arrangement may also comprise a plurality of control units or visual indicator or display units. It makes sense for there to be a plurality of control units if for example the road-milling machine has a plurality of driver's positions. It makes sense for there to be a plurality of indicator or display units when for example they are arranged to be redundant, e.g. are arranged in pairs, to ensure that there is a clear view of at least one of the indicator or display units under all conditions of operation. The visual indicator or display unit may be provided on the road-milling machine or as an independent unit on the transporting vehicle.

What may be meant by the first state of operation is a request for the transporting vehicle to be braked or stopped and what may be meant by the second state of operation is a request for the transporting vehicle to be started or to continue travelling. What is crucial is that the indication or display of the two states of operation is visual. Unlike the horn signals, the visual request for braking or starting cannot irritate other road users or the site personnel. It is also an advantage that the visual indication or display for the driver of the transporting vehicle is always present. Unlike the horn signals, it is not possible for the request for braking or starting to be missed. Even if the driver of the transporting vehicle is not paying attention at the moment when the driver of the road-milling machine gives the signal, he can see at any time from the sustained visual signal whether the transporting vehicle is to move or stop. The horn preserves its signalling effect both for other road users and for the site personnel. The visual signal from the indicator or display unit can be perceived even when the driver of the transporting vehicle is distracted by ambient noise. What is more, the visual indication or display does not involve any noise nuisance for the site personnel or for people living nearby.

The visual indicator or display unit may take different forms. All that is crucial is that the states of operation are indicated or displayed visually. In a preferred embodiment, two states of operation are indicated or displayed, with the first state of operation being indicated or displayed by a first symbol and the second state of operation by a second symbol, which symbols are different from one another. A variety of symbols may be used. These symbols should not however be the same as those used on road signs. The request to brake or stop is preferably shown as a cross and that to start or move as an arrow. The two symbols may also be of different colours. The cross may for example be indicated or displayed in red and the arrow in green. The symbols may also flash or move across the indicating or display surface to make the driver more attentive.

The control unit is preferably arranged at the driver's position on the road-milling machine at which the driver of the machine is able to watch the load-carrying space of the transporting vehicle and operate the control unit.

As controls, the control unit may have one or more keys or buttons or switches with which the two states of operation can be preset.

In an embodiment which is a particular preference, the control unit has only one control, by which means mis-operation can be avoided. The control is preferably a push-button, the control unit being so designed that, on the push-button being pressed, one state of operation is indicated or displayed until such time as the push-button is pressed again, following which the other state of operation is then indicated or displayed. Consequently, the driver of the machine can change between the two states of operation, which are each permanently indicated or displayed by the visual indicator or display unit, simply by pressing the push-button.

It is however also possible for two push-buttons to be provided on the control unit, with one state of operation being preset with one push-button and the other state of operation being preset with the other push-button. The control unit is then so designed that, on one push-button being pressed, one state of operation is indicated or displayed until such time as the other push-button is pressed, on the pressing of which the other state of operation is indicated or displayed.

Particularly if the control takes the form of a push-button, it will be found to be advantageous for the states of operation which are preset to be shown to the driver of the road-milling machine. This may for example be done by means of visual symbols on the control unit or on the rear of the indicator or display unit. Indicator lamps or the like may for example be provided.

Rather than one or two push-buttons as controls, an alternative embodiment provides a switch having at least two switched positions, with one state of operation being preset with one switched position and the other state of operation with the other switched position. The switch preferably has two switched positions in which it remains, which means that the driver of the machine can at once see from the position of the switch whether one or the other state of operation has been preset without any other further visual signals being required to show the state of operation.

In the case of a front-unloading road-milling machine, in which the conveyor belt of the material-handling arrangement extends forward in the working direction to a level higher than the front part of the chassis of the machine, the visual indicator or display unit preferably has an indicating or display surface which faces in the direction of operation of the milling machine. Consequently, the driver of the transporting vehicle which is being driven ahead of the front-unloading road-milling machine is able to see the indicating or display surface of the visual indicator or display unit in his rear-view mirror.

The visual indicator or display unit having the indicating or display surface is advantageously arranged on the road-milling machine in such a way that the driver of the transporting vehicle can see the indicating or display surface in the left-hand and/or right-hand rear-view mirror of the transporting vehicle. The visual indicator or display unit is preferably arranged on one or both longitudinal sides of the chassis of the machine. The indicator or display unit should be arranged at the same height as that at which the rear-view mirror of the transporting vehicle is situated.

Known road-milling machines have a rear-view mirror on one or both longitudinal sides. An embodiment which is a particular preference makes provision for the visual indicator or display unit to be arranged on the front of the rear-view mirror of the road-milling machine. This embodiment has the advantage that the indicator or display unit is a part of the rear-view mirror, which latter is arranged in the field of vision of the driver of the transporting vehicle. What is more, the incorporation of the indicator or display unit in the rear-view mirror does not call for any additional items which might obstruct the vision of the driver of the road-milling machine to be mounted on the latter.

In an alternative embodiment, the visual indicator or display unit takes the form of an independent unit which is not arranged on the road-milling machine but is arranged in or on the transporting vehicle. In this embodiment, the control unit has a transmitting unit for transmitting a signal for the at least two states of operation and the indicator or display unit has a receiving unit for receiving the signal for the at least two states of operation. The transmitting and receiving units may be radio transmitters and receivers which are familiar to the person skilled in the art. The alternative embodiment has the advantage that the visual indicator or display unit can be arranged in the driver's cab directly in the field of vision of the driver of the transporting vehicle. There is thus no need for the driver of the transporting vehicle to watch the indicator or display unit in his rear-view mirror. It is for example possible for the visual indicator or display unit to take the form of a portable unit which is handed to the driver of the transporting vehicle on the site. It is however also possible for the visual indicator or display unit to be permanently installed in the transporting vehicle. It is for example possible for the visual indicator or display unit to take the form of what is referred to as a head-up display, which is familiar to the person skilled in the art.

In another preferred embodiment, the signalling effect of the visual indicator or display unit is further boosted by an audio signal for the driver of the transporting vehicle being given in addition when the indication or display changes from one state of operation to the other. This is particularly advantageous in the embodiment where the visual indicator or display unit is an independent unit which can be arranged in the driver's cab of the transporting vehicle. The volume of the audio signal does not need to be loud in this case, and it is thus not a nuisance to others.

Figure 2A:
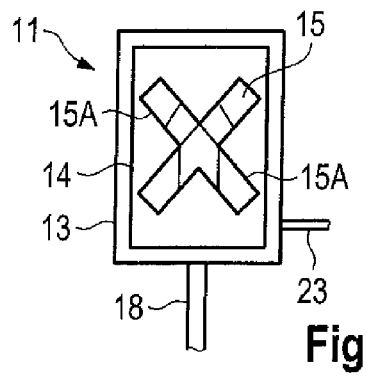
Figure 2B:
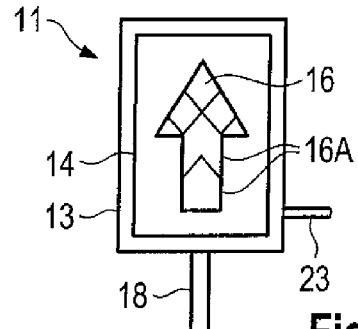
Figure 2C:
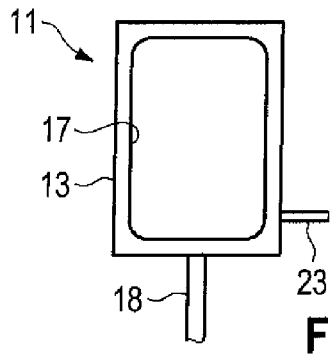
Figure 2D:
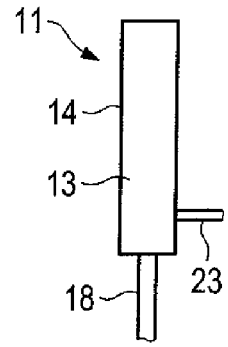
Figure 3:
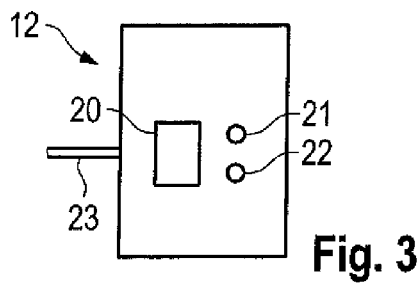
Figure 4:
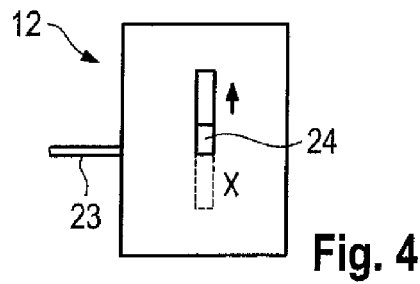
Figure 5:
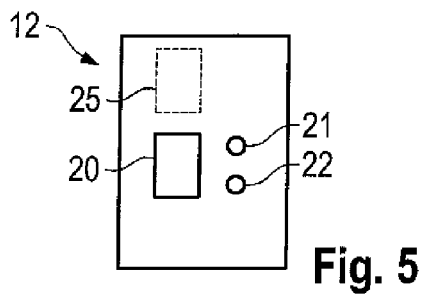
Figure 6:
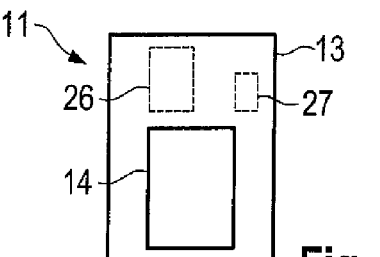

A plurality of embodiments of the invention will be explained in detail below by reference to the accompanying drawings. In the drawings:

FIG. 1 is a simplified representation of a road-milling machine together with a transporting vehicle, FIG. 2A is a view from the front of the visual indicator or display unit, the symbol shown being that for stopping, FIG. 2B shows the visual indicator or display unit, the symbol shown being that for starting, FIG. 2C is a view of the visual indicator or display unit from the rear, FIG. 2D is a view of the visual indicator or display unit from the side, FIG. 3 shows a first embodiment of control unit, FIG. 4 shows a second embodiment of control unit, FIG. 5 shows a further embodiment of control unit, FIG. 6 shows a further embodiment of indicator or display unit.

FIG. 1 is a simplified schematic representation of a road-milling machine which is a front-unloading road-milling machine. The road-milling machine 1 has a chassis 2 and running gear 3. The driver's position 4 is situated between the front and rear parts of the chassis 2 of the machine. As well as this, the road-milling machine also has a milling arrangement 5, which may also be referred to as a milling drum, arranged on the chassis 2 of the machine, by which material can be milled off the surface of a road.

A material-handling arrangement 6, which may also be referred to as a material-handling conveyor, loads the milled-off material onto a transporting vehicle 10, such as a dumper lorry for example, which drives ahead of the road-milling machine. The material-handling arrangement 6 has a conveyor belt 7 which extends forward in the working direction A to a level higher than the front part of the chassis 2 of the machine. The material is fed at a relatively high speed and it is discharged, in the direction of working A, above the load-carrying space 9 of the transporting vehicle 10 at the discharge point 8 ahead of the front end of the conveyor belt 7. Discharge point 8 may also be referred to as a discharge area.

The transporting vehicle 10 is loaded as follows. The transporting vehicle 10 travels at a somewhat higher speed than the road-milling machine 1, and the discharge point 8 thus moves from the front end to the rear end of the load-carrying space 9. The transporting vehicle 10 then stops whereas the road-milling machine 1 continues its travel. Consequently, the discharge point 8 moves back to the front end of the load-carrying space 9. This process is repeated until such time as the transporting vehicle is fully loaded.

The road-milling machine 1 has an arrangement which signals to the driver of the transporting vehicle 10 when he is to start or stop the transporting vehicle. This arrangement will be described in detail below.

The signalling arrangement comprises a visual indicator or display unit 11 and a control unit 12. In the first embodiment, the visual indicator or display unit 11 and the rear-view mirror of the road-milling machine are arranged in a common housing, and thus form a unit which, in the present embodiment, is arranged to project outwards on that side of the chassis 2 of the machine which is on the left in the direction of working A. The visual indicator or display unit 11 is merely indicated in FIG. 1. FIGS. 2A to 2D are views of the visual indicator or display unit 11 from the front, rear and side.

The visual indicator or display unit 11 has a housing 13 having an indicating or display surface 14 which faces forward in the direction of working A, the said indicating or display surface 14 thus being situated in the field of vision which the rear-view mirror 10A of the driver of the transporting vehicle 10 has.

In the present embodiment, two symbols which are preset by the driver of the road-milling machine 1 from the control unit 12 are indicated or displayed alternately on the visual indicator or display unit 11. The first symbol, which tells the driver to brake or stop, is a cross 15 (FIG. 2A), whereas the second symbol, which tells the driver to start or to continue moving, is an arrow 16 (FIG. 2B). The cross 15 and arrow 16 are preferably of different colours and in particular the cross is red and the arrow green. The red cross and the green arrow are preferably composed of a plurality of illuminable segments 15A, 16A which are backlit by red and green LED's (not shown) respectively. The individual illuminable segments are driven in such a way that either a red cross 15 or a green arrow 16 is shown.

FIG. 2C shows the rear of the housing 13 of the visual indicator or display unit 11, on which latter the adjustable rear-view mirror 17 of the road-milling machine 1 is situated. The housing 13 of the visual indicator or display unit 11 is fastened to a bracket 18 on the chassis 2 of the machine (FIG. 2D).

FIG. 3 shows the control unit 12, which is arranged, at the driver's position 4, on the control panel for the driver of the road-milling machine 1. The control unit 12 has a push-button 20 and two indicator lamps 21, 22, these being in particular a red and a green LED, and an electrical circuit (not shown). The control unit 12 and the visual indicator or display unit 11 communicate by way of an electrical line 23. The electrical circuit is so designed that, on the push-button 20 being pressed, the red cross 15 (FIG. 2A) is indicated or displayed on the indicating or display surface 14 of the visual indicator or display unit 11 until such time as the push-button 20 is pressed again, after which the green arrow 16 (FIG. 2B) is then indicated or displayed. On the push-button 20 being pressed again, the red cross (FIG. 2A) is then indicated or displayed again. The driver of the road-milling machine 1 is thus able to give the driver of the transporting vehicle 10 the necessary instructions simply by pressing the push-button 20. The driver of the machine is told what the state of operation at the time is because the red LED 21 is lit when the red cross is being indicated or displayed and the green LED 22 is lit when the green arrow is being indicated or displayed.

FIG. 4 shows an alternative embodiment of control unit 12 which differs from the control unit which was described by reference to FIG. 3 in that a switch 24 which has two switched positions in which it remains is provided rather than the push-button 20. The first switched position of the switch 24 is shown in solid lines in FIG. 4 and the second switched position in dashed lines. When the switch 24 is in the first switched position the red cross (FIG. 2A) is indicated or displayed, whereas the green arrow (FIG. 2B) is indicated or displayed when the switch is in the second switched position. The driver of the machine can thus see simply from the position of the switch what instructions he is giving to the driver of the transporting vehicle. Indicator lamps can be dispensed with in this case.

In the embodiments which are described above, the visual indicator or display unit 11 is part of the road-milling machine 1. However, in an alternative embodiment the visual indicator or display unit forms an independent unit which is arranged in or on the transporting vehicle 10. The visual indicator or display unit may for example be handed over to the driver of the transporting vehicle and may be arranged by the latter in the cab of the vehicle. The indicator or display unit may however also be permanently installed in the cab of the vehicle, such as in the form of what is referred to as a head-up display. In this embodiment, communication between the control unit 12 and the visual indicator or display unit 11 is not by way of an electrical line but by a radio link. The control unit 12 therefore has a transmitting unit 25, which is merely indicated, and the visual indicator or display unit 11 has a receiving unit 26, which is also merely indicated. The transmitting unit 25 transmits a radio signal which specifies one or other state of operation and which the receiving unit 26 receives, one or other state of operation thus being indicated or displayed on the indicating or display surface 14. Otherwise this embodiment corresponds to the embodiments described above, the items which correspond to one another also being given the same reference numerals. As well as the indicating or display surface 14, the indicator or display unit 11 also has an audio signal emitter 27 which is situated in the housing 13 of the indicator or display unit. At any change in what is indicated or displayed visually from one state of operation to the other, i.e. stopping and travelling, the audio signal emitter 27 emits an audio signal which the driver of the transporting vehicle is able to perceive clearly in the cab of his vehicle but which is not a nuisance to the site personnel or to other road users.

What is claimed is:

1. A self-propelled road-milling machine, comprising:
a chassis having two longitudinal sides;
a driver's position arranged on the chassis for a driver of the road-milling machine;
a milling drum supported from the chassis for milling off material;
a material handling conveyor supported from the chassis for feeding the milled off material to a discharge point where the milled off material is to be received by a transporting vehicle separate from the road-milling machine;
at least one control unit carried by the road-milling machine for entry of one of at least two different states of operation by the driver of the road-milling machine, the control unit being configured such that the driver of the road-milling machine can switch repeatedly between the first and second states of operation during continuous forward operation of the road-milling machine;
at least one visual indicator operably associated with the control unit so that during forward operation of the road-milling machine the visual indicator indicates to a driver of the transporting vehicle which one of the at least two states of operation has been entered on the control unit by the driver of the road-milling machine; and
at least one rear-view mirror for the driver of the road-milling machine, the at least one rear-view mirror arranged on at least one of the two longitudinal sides of the road-milling machine, the at least one rear-view mirror and the at least one visual indicator forming at least one unit;
wherein the at least two states of operation include a first state of operation wherein the transporting vehicle is to move forward away from the road-milling machine and a second state of operation wherein the transporting vehicle is to stop;
wherein the visual indicator indicates a green first symbol for the first state of operation wherein the transporting vehicle is to move forward away from the road-milling machine and a red second symbol for the second state of operation wherein the transporting vehicle is to stop, the first symbol being different from the second symbol;
wherein the at least one control unit includes a control member for presetting the first and second states of operation, the control member including a push-button, the control unit being operable so that, on the push-button being pressed one of the states of operation is indicated on the visual indicator by display of the first symbol until such time as the push-button is pressed again, following which another of the states of operation is indicated on the visual indicator by display of the second symbol;
wherein the road-milling machine is a front-unloading road-milling machine and the material-handling conveyor extends forward in a working direction of operation to a level higher than a front part of the chassis of the road-milling machine; and
wherein the visual indicator includes an indicating surface facing in the working direction of operation.

2. The road-milling machine of claim 1, wherein:
the at least one control unit is arranged at the driver's position.

3. The road-milling machine of claim 1, wherein:
the at least one visual indicator comprises an independent indicator unit separate from the road-milling machine, so that the indicator unit may be located in or on the transporting vehicle;
the at least one control unit includes a transmitter for transmitting a signal corresponding to the state of operation entered on the control unit by the driver of the road-milling machine; and
the independent indicator unit includes a receiver for receiving the signal.

4. The road-milling machine of claim 3, wherein:
the independent indicator unit includes an audio signal emitter for emitting an audio signal when the visual indicator changes from one state of operation to another state of operation.

5. The road-milling machine of claim 1, wherein:
the control unit includes a visual control unit indicator, visible from the driver's position and indicative of which one of the two different states of operation has been entered by the driver of the road-milling machine.

6. The road-milling machine of claim 1, wherein:
the at least one visual indicator is located on the road-milling machine and faces forward so that the at least one visual indicator may be viewed by the driver of the transporting vehicle in a rear-view mirror of the transporting vehicle.

7. A self-propelled road-milling machine, comprising:
a chassis;
a milling drum supported from the chassis for milling off material from a ground surface;
a material handling conveyor supported from the chassis for feeding the milled off material to a discharge area where the milled off material is to be received by a transporting vehicle separate from the road-milling machine;
a visual indicator display located on the road-milling machine and operable during forward operation of the road milling machine to display one of a green first and a red second visual indicator, the first visual indicator indicating to a driver of the transport vehicle that the transport vehicle should move forward away from the road-milling machine and the second visual indicator indicating to the driver of the transport vehicle that the transport vehicle should stop;
a control unit located on the road-milling machine and including an input operable for a driver of the road-milling machine to select one of the first and second visual indicators to be displayed on the visual indicator display, the control unit being configured such that the driver of the road-milling machine can switch repeatedly between the first and second states of operation during continuous forward operation of the road-milling machine;

a rear-view mirror extending to one side of the chassis; and wherein the visual indicator display is located on a forward facing side of the rear-view mirror;

wherein the material handling conveyor extends forward so that the discharge area is located ahead of a front of the chassis; and wherein the input comprises a push-button.

8. The road-milling machine of claim 7, wherein:

the first and second visual indicators are first and second visual symbols having first and second different shapes, respectively.

9. The road-milling machine of claim 7, wherein:

the control unit includes a visual control unit indicator visible to the driver of the road-milling machine and indicative of which one of the first and second visual indicators has been selected by the driver of the road-milling machine.

10. A self-propelled road-milling machine, comprising:

a chassis;

a milling drum supported from the chassis for milling off material from a ground surface;

a material handling conveyor supported from the chassis for feeding the milled off material to a discharge area where the milled off material is to be received by a transporting vehicle separate from the road-milling machine;

a control unit located on the road-milling machine, the control unit including a transmitter for transmitting a display signal, and the control unit including an input operable for a driver of the road-milling machine to select one of at least two states of operation including a first state of operation wherein the transporting vehicle moves forward away from the road-milling machine and a second state of operation wherein the transporting vehicle is stopped, the control unit being configured such that the driver of the road-milling machine can switch repeatedly between the first and second states of operation during continuous forward operation of the road-milling machine; and an independent display unit separate from the road-milling machine, the display unit including a receiver operable during forward operation of the road-milling machine to receive the display signal from the transmitter of the control unit, the display unit operable to display a green first visual indicator or a red second visual indicator corresponding to the state of operation selected by the driver of the road-milling machine;

wherein the input of the control unit comprises a push-button; and wherein the material handling conveyor extends forward so that the discharge area is located ahead of a front of the chassis.

11. The road-milling machine of claim 10, wherein:

the display unit is operable to display different shape visual symbols corresponding to different states of operation selected by the driver of the road-milling machine.

12. The road-milling machine of claim 10, wherein:

the independent display unit includes an audio signal emitter operable to emit an audio signal when a new display signal is received.

* * * * *